(12) United States Patent
Park et al.

(10) Patent No.: US 6,754,683 B1
(45) Date of Patent: Jun. 22, 2004

(54) METHOD OF IMPLEMENTING AN ELECTRONIC CALCULATOR FUNCTION IN A PORTABLE TERMINAL

(75) Inventors: Chan-Kyu Park, Inchon-Kwangyokshi (KR); Joung-Kyou Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/519,517

(22) Filed: Mar. 6, 2000

(30) Foreign Application Priority Data

Mar. 5, 1999 (KR) .......................................... 1999-7363

(51) Int. Cl.[7] .............................................. G06F 13/00
(52) U.S. Cl. ...................................... 708/160; 708/105
(58) Field of Search ............................... 708/160–169, 708/105–112; 345/773, 864

(56) References Cited

U.S. PATENT DOCUMENTS

| | | | | |
|---|---|---|---|---|
| 5,289,393 A | * | 2/1994 | Kaya | |
| 5,313,396 A | * | 5/1994 | Terpstra et al. | |
| 5,448,532 A | * | 9/1995 | Kataoka et al. | |
| 5,479,344 A | * | 12/1995 | Keziah, Jr. | |
| 5,586,060 A | * | 12/1996 | Kuno et al. | |
| 5,732,001 A | * | 3/1998 | Nakayama et al. | |
| 5,870,319 A | * | 2/1999 | Thornton et al. | |
| 5,890,178 A | * | 3/1999 | Haneda | |
| 6,012,037 A | * | 1/2000 | Yoshikawa | |
| 6,169,538 B1 | * | 1/2001 | Nowlan et al. | |
| 6,243,741 B1 | * | 6/2001 | Utsumi | |
| 6,335,725 B1 | * | 1/2002 | Koh et al. | |
| 6,417,869 B1 | * | 7/2002 | Do | |

* cited by examiner

*Primary Examiner*—Tan V. Mai
(74) *Attorney, Agent, or Firm*—Dilworth & Barrese LLP

(57) ABSTRACT

A method of implementing an electronic calculator function in a portable terminal having a display comprises the steps of: setting an electronic calculator mode; displaying separately on the display: a first input window which receives and displays therein numeric information subject to arithmetic operation, a second input window which receives and displays therein operation/control commands, and an output window which displays therein an information input state and a result of the operation; displaying the numeric information in the output window when the corresponding information is inputted through the first input window; performing an operation on the numeric information displayed in the output window when the operation/control commands are inputted through the second input window; and displaying resultant numeric information, resulting from the operation, in the output window. The size of the output window may be increase as needed by reducing the sizes of the first and second input windows.

12 Claims, 5 Drawing Sheets

METHOD OF IMPLEMENTING AN ELECTRONIC CALCULATOR FUNCTION IN A PORTABLE TERMINAL

BACKGROUND OF THE INVENTION

1. Field of the Invention

The present invention relates to a method of implementing an applied function of a portable terminal, and more particularly to a method of implementing an electronic calculator function in a portable terminal having a relatively small-sized display screen.

2. Description of the Related Art

A typical portable terminal performs telephone functions and other information processing functions. Implementation of additional functions in portable terminals is of great importance in adding conveniences for a user. One additional function which is commonly incorporated is an electronic calculator function. The electronic calculator function allows a user to perform calculations using the four common arithmetic operators and view the result on the display.

However, the electronic calculator function in a portable terminal is typically troublesome to implement due to the relatively small display screen size of the terminal. Specifically, in a portable terminal whose main object is to perform telephone functions, it is difficult to implement an electronic calculator function that is convenient for a user to use. The implementation is further complicated due to the limited number of keys on a keypad designed primarily for telephone functions.

FIG. 1 illustrates the electronic calculator operating state displayed as the changed display state in a conventional portable terminal where the electronic calculator function is implemented. Referring to FIG. 1, in an electronic calculator mode of the portable terminal, numerals from 0 to 9 may be inputted and the four arithmetic operations may be performed on the input numeric information by inputting predetermined operation keys. In performing the electronic calculator function, the input of a deletion command for correcting the inputted information, a decimal point for decimal calculations, etc., may be required. Thus, a user must separately input predetermined keys to perform such commands. In other words, the user must perform the arithmetic operations by finding and inputting the keys determined as the four arithmetic operators after inputting numeral keys through the keypad, which causes the user inconvenience.

Accordingly, the electronic calculator function itself implemented in the conventional portable terminal is a convenient function, but the actual use thereof causes the user inconvenience due to the small size of the display screen and the troublesome input of the necessary operation commands. As a result, the electronic calculator function implemented in the conventional portable terminal complicates the use of the portable terminal since it cannot be conveniently used by the user.

SUMMARY OF THE INVENTION

Accordingly, it is an object of the present invention to provide a method of implementing an electronic calculator function in a portable terminal having a relatively small-sized display screen whereby the user can use the electronic calculator function more conveniently and the operation state of the electronic calculator function can be displayed more elegantly.

Specifically, the object of the present invention is to provide an electronic calculator function implementing method in a portable terminal having a small-sized display screen and main body which can compensate for the limitations in size and enables the user to use the electronic calculator function more conveniently with its elegant display.

Another object of the present invention is to provide an electronic calculator function implementing method in a portable terminal which allows the convenient input of calculator operation information in the portable terminal and displays the result of the operation as one picture on the small-sized display screen.

Still another object of the present invention is to provide an electronic calculator function implementing method in a portable terminal having a touch screen panel (TSP) and a keypad as an information input means and having a relatively small-sized display screen whereby the user can use the electronic calculator function more easily.

In order to achieve the above objects according to the present invention, a method of implementing an electronic calculator function in a portable terminal having a display is provided, comprising the steps of: setting an electronic calculator mode; displaying separately on the display: a first input window which receives and displays therein numeric information subject to arithmetic operation, a second input window which receives and displays therein operation/control commands, and an output window which displays therein an information input state and a result of the operation; displaying the numeric information in the output window when the corresponding information is inputted through the first input window; performing an operation on the numeric information displayed in the output window when the operation/control commands are inputted through the second input window; and displaying resultant numeric information, resulting from the operation, in the output window.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Figure 1:
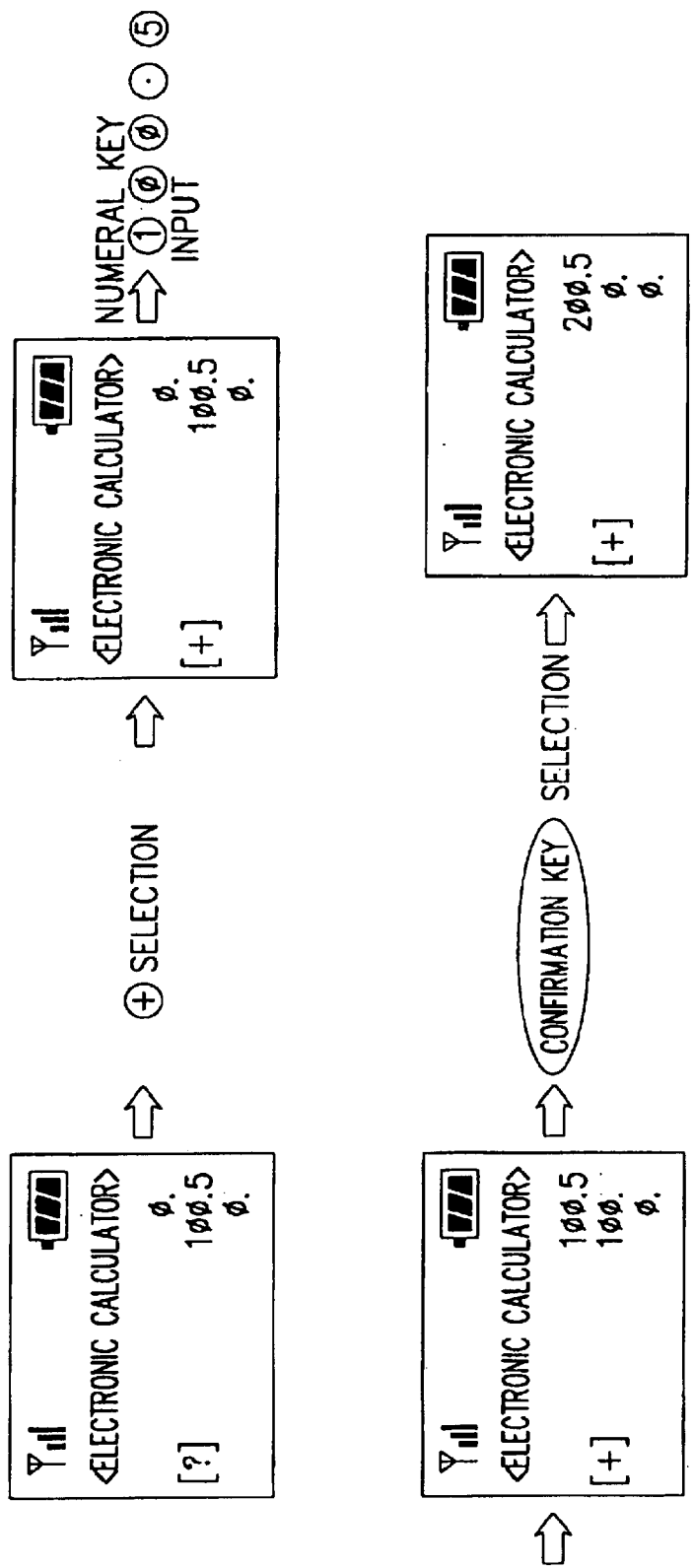
FIG. 1 illustrates an electronic calculator operating state displayed on a display screen of a conventional portable terminal where the electronic calculator function is implemented.

Reference will now be made in greater detail to the preferred embodiment of the present invention. In the accompanying drawings, the same or similar elements are denoted by the same reference numerals even though they are depicted in different drawings. In the following description of the present invention, many specific items such as detailed circuit elements are indicated, but they are provided to further the understanding of the present invention and thus it will be understood by those skilled in the art that the present invention can be performed without such specific items. Meanwhile, a detailed description of known functions and configurations incorporated herein will be omitted when it may obscure the subject matter of the present invention.

Figure 2:
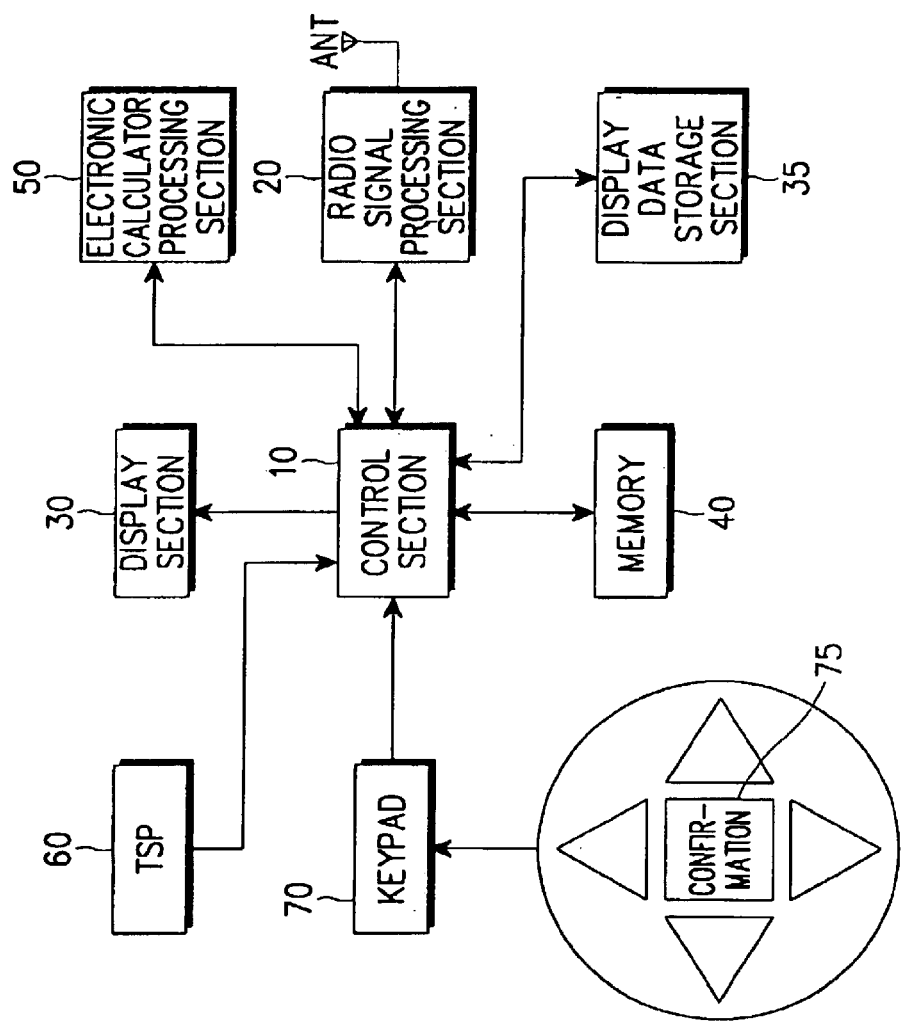
FIG. 2 is a block diagram illustrating the construction of a typical portable terminal where the electronic calculator function implementing method according to the present invention is applied.

FIG. 2 is a block diagram illustrating the construction of a typical portable terminal where the electronic calculator function implementing method according to the present invention is applied. Referring to FIG. 2, a control section 10 is typically implemented by a one-chip microprocessor, and controls the operation of the portable terminal as well as an electronic calculator processing section 50 implemented according to the embodiment of the present invention. Specifically, if the user inputs various information to be operated and operation/control commands in accordance with the electronic calculator function, the control section 10 controls the electronic calculator processing section 50 so that the resultant output is processed.

A memory 40 includes a read only memory (ROM) for storing programs for performing the operation of the portable terminal and the operation of the electronic calculator according to the embodiment of the present invention, and a random access memory (RAM) for temporarily storing data produced during the performance of the above programs. The RAM is typically used as a buffer. The memory also includes an electrically erasable programmable ROM (EEPROM) for storing option data with respect to the above programs, and the function implemented according to the present invention is stored in the EEPROM as a prescribed coded control program.

A keypad 70 is provided with a plurality of numeral keys and function keys, and outputs key data according to the input of the respective keys. The numeral keys provided in the keypad include numerals in the range of 0 to 9, and the function keys include a typical calling key, a search key and so on. The keypad also includes a direction key 75 for effecting the movement of an activated cursor in a display device.

Also, according to the preferred embodiment of the present invention, the portable terminal uses a touch screen panel (TSP) 60 in addition to the keypad as a user information input means. The touch screen panel 60 recognizes the characters inputted by the user by the pressing points, and outputs touch screen panel data. The outputted data is recognized and processed by the control section 10. The TSP 60 provided according to the preferred embodiment of the present invention is for facilitating the user information input therethrough. For reference, the touch screen panel data includes coordinate data which corresponds to X,Y coordinates of the pressing points provided in the touch screen panel, and state data that represents whether the spatial coordinate data is successively produced. The touch screen panel data is sent by the TSP 60 in a form that can be recognized by the control section 10.

A display section 30 is a device through which the user can see the whole operating state of the portable terminal and inputted numerals, and is typically implemented by an LCD. The display data displayed on the display section 30 is stored in a display data storage section 35, and is called font data. In the embodiment of the present invention, numeral icons, operation command icons, control command icons, etc., are displayed on the display section 30, and stored in the display data storage section.

The electronic calculator processing section 50 performs the operation required for electronic calculation by reading the electronic calculator program from the memory 40 under the control of the control section 10, and performing a high-speed information process according to the arithmetic operations. Meanwhile, the electronic calculator processing section 50 can be implemented as a separate device or as an extended function of the control section 10 according to the intention of the designer.

A radio signal processing section 20 processes transmitted/received radio signals, and comprises a duplexer for separating the radio signal transmitted/received through an antenna ANT, a receiving section for demodulating the radio signal received through the antenna ANT to a baseband signal under the control of the control section 10, processing the demodulated signal, and outputting the resultant signal, and a transmission section for modulating a processed output signal to a radio signal under the control of the control section 10 and outputting the modulated signal. A radio telephone function and data transmission/reception are performed in the radio signal processing section 20.

Figure 3:
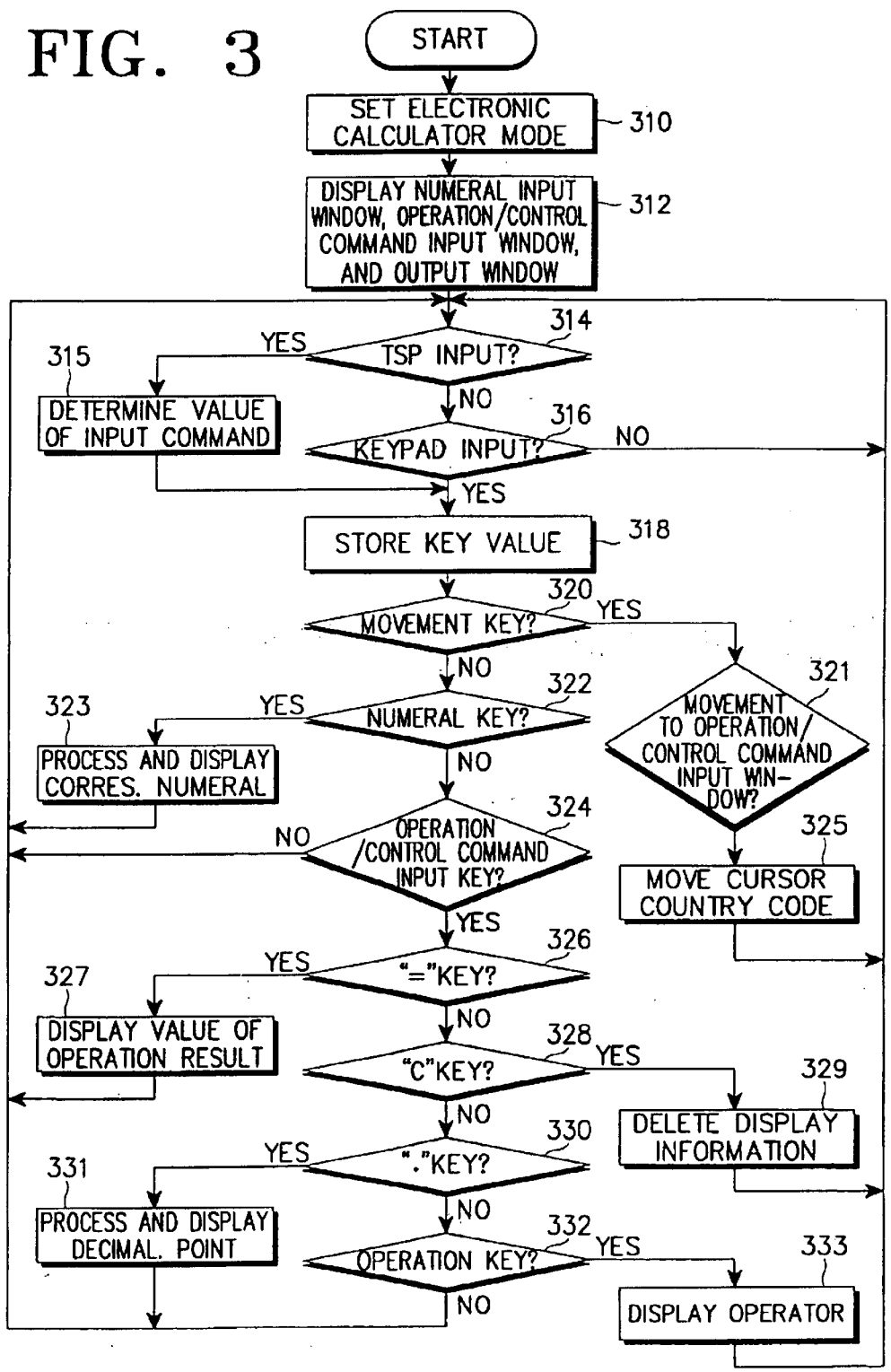
FIG. 3 is a flowchart illustrating the electronic calculator function implementing method in a portable terminal according to a preferred embodiment of the present invention.

FIG. 3 is a control flowchart illustrating the electronic calculator function implementing method in a portable terminal according to a preferred embodiment of the present invention.

Referring to FIG. 3, when a user activates the electronic calculator mode by in step 310, the electronic calculator function is performed by driving the electronic calculator processing section 50. At step 312, the display section 30 displays separately the numeral input window, operation/control command input window, and output window.

The numeral input window receives and displays the information to be operated. For instance, the numerals from 0 to 9 for the electronic calculation are displayed on a predetermined region of the display screen when the user inputs the numeral keys. The numerals may be displayed in the form of icons, and the selection of the corresponding numerals may be made by the input of the numeral keys or the touch operation of the TSP 60.

The operation/control command input window includes operators for four arithmetic operations (+, −, *, /), resultant output command information "=", deletion command information "C", and decimal point information "." which are required for performing the electronic calculation. The input of such commands is effected by the search operation using the direction key 75 or the touch operation of the TSP 60.

The output window is provided to display the numeral information selected and inputted through the numeral input window and the result according to the input of the information to be operated. As a result, at step 312, if the electronic calculator mode is set by the user, the information display and input window for enabling the user to recognize and input the information to be operated, the operation/control command input window for performing desired operations, and the output window for displaying the resultant information according to the information to be operated and the operation/control commands inputted by the user are separately displayed.

At step 314, it is detected whether any touch of the TSP 60 is inputted. If so, a pre-designated key value is determined in the touch region inputted at step 315, and the determined key value is stored at step 318. If no touch of the TSP 60 is inputted at step 314, it is determined whether any input through the keypad 70 exists at step 316, and if so, the key value corresponding to inputted keypad is stored at step 318. At step 320, it is determined whether the stored key value corresponds to a movement key, i.e., the direction key 75. If the key value corresponds to the movement key, it is determined whether the movement is requested in the displayed operation/control command input window at step 321, and if so, the movement of the cursor, which waits for the selection input, is performed in an inputted direction at step 325. This case refers to the case that the user inputs the direction key 75 through the operation/control command input window or the case that the user touches the display region of the operation/control command input window when the user touches the TSP 60.

At step 322, it is determined whether the stored key value is the value according to the input of a numeral key. If so, the corresponding numeral is processed at step 323, and the display data corresponding to the inputted numeral is displayed through the output window. If not, at step 324, it is determined whether the stored key value corresponds to the input through the operation/control command input window. This determination is effected by the key value through the input of the designated keypad, the input according to the search by the direction key, and the input according to the touch of the TSP 60. If so, it is determined whether the key value corresponds to '=', 'C', '.', and four arithmetic operations (+, −, *, /), respectively, at steps 326, 328, 330, and 332. Then, if the key value corresponds to the stored key value, the resultant value of the operation is displayed on the output window at step 327, the information displayed on the output window is deleted at step 329, the decimal point is processed and displayed at step 331, or the corresponding operators for the four arithmetic operations which are selected and inputted are displayed in step 333, respectively.

Meanwhile, the operators displayed at step 333 are displayed on a specified region of the output window. Specifically, if the operator is inputted, the specified region of the output window is allocated as the operator display region, and the inputted operator is displayed on the allocated region, so that the user can recognize what operator is inputted. Meanwhile, in displaying the resultant value of the operation at step 327, the resultant value may be larger than the information size which can be displayed on the output window, i.e., the number figure of the resultant value may be too long to be displayed on the output window. According to the embodiment of the present invention, specified information displayed on the operation/control command input window is deleted, and the deleted region is added to the output window. Specifically, since the portable terminal has a relatively small-sized display screen, and thus the numeral information having a large number of figures cannot be displayed on the display screen, the region allocated as the input window is changed to the output window, and the numeral information is displayed on the changed region.

Figure 4A:
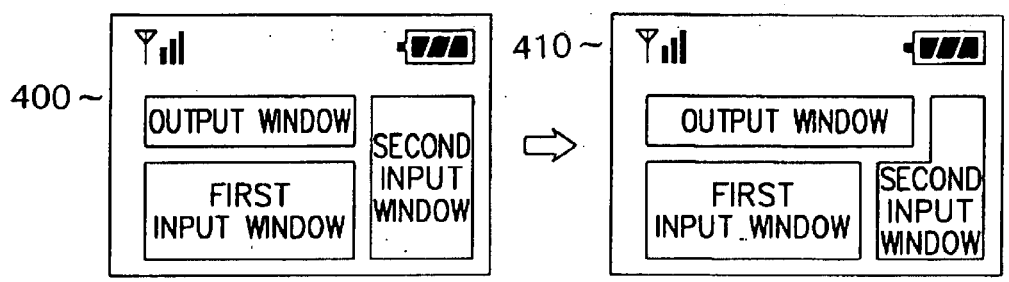
FIGS. 4a to 4c illustrates a display states of the electronic calculator function implemented in a portable terminal according to a preferred embodiment of the present invention.
Figure 4B:
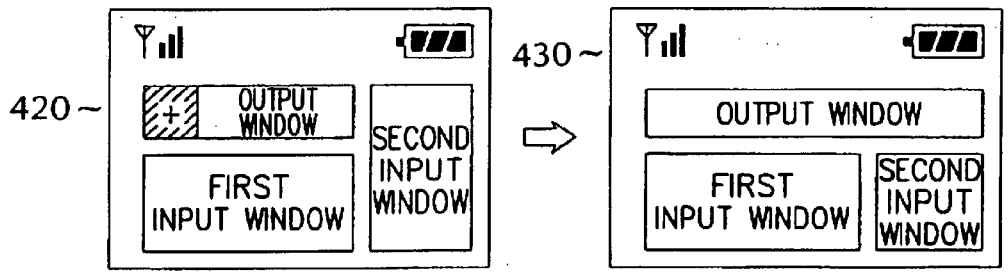

FIGS. 4A and 4B are views illustrating the display states of the electronic calculator function implemented in a portable terminal according to a preferred embodiment of the present invention.

Referring to FIGS. 4A and 4B, the state of the display screen 400 results from the performance of step 312 in FIG. 3, and on the display screen 400, the output window, the first input window (i.e., information display and input window), and the second input window (i.e., operation/control command display and input window) are separately displayed. The state of the display screen 410 results when a specified region of the second input window is changed to the output window to display the additional display information in a case where the size of the resultant value of the operation is larger than that which can be displayed on the output window. This state results from the performance of step 327 in FIG. 3.

The state of the display screen 420 in FIG. 4B results from the user selection of the '+' operator. If the user selects the '+' operator, the '+' information is displayed on a specified region of the output window. This results from the performance of step 333 in FIG. 3, and the user can recognize the operation command which he or she selected and inputted. The state of the display screen 430 results when the size of the second input window is changed to the output window to display additional display information. Many other variations regarding the states of the display screen can be implemented according to the embodiment of the present invention.

Figure 4C:
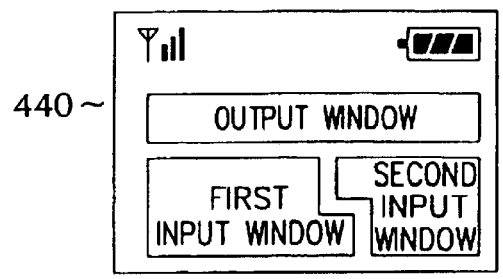

FIG. 4C is a view illustrating the display state of the electronic calculator function implemented in a portable terminal according to a preferred embodiment of the present invention. In display 440, the output window is initially displayed at a maximum size in implementing the electronic calculator function. In this case, a relatively large-sized operation result can be displayed.

Figure 5:
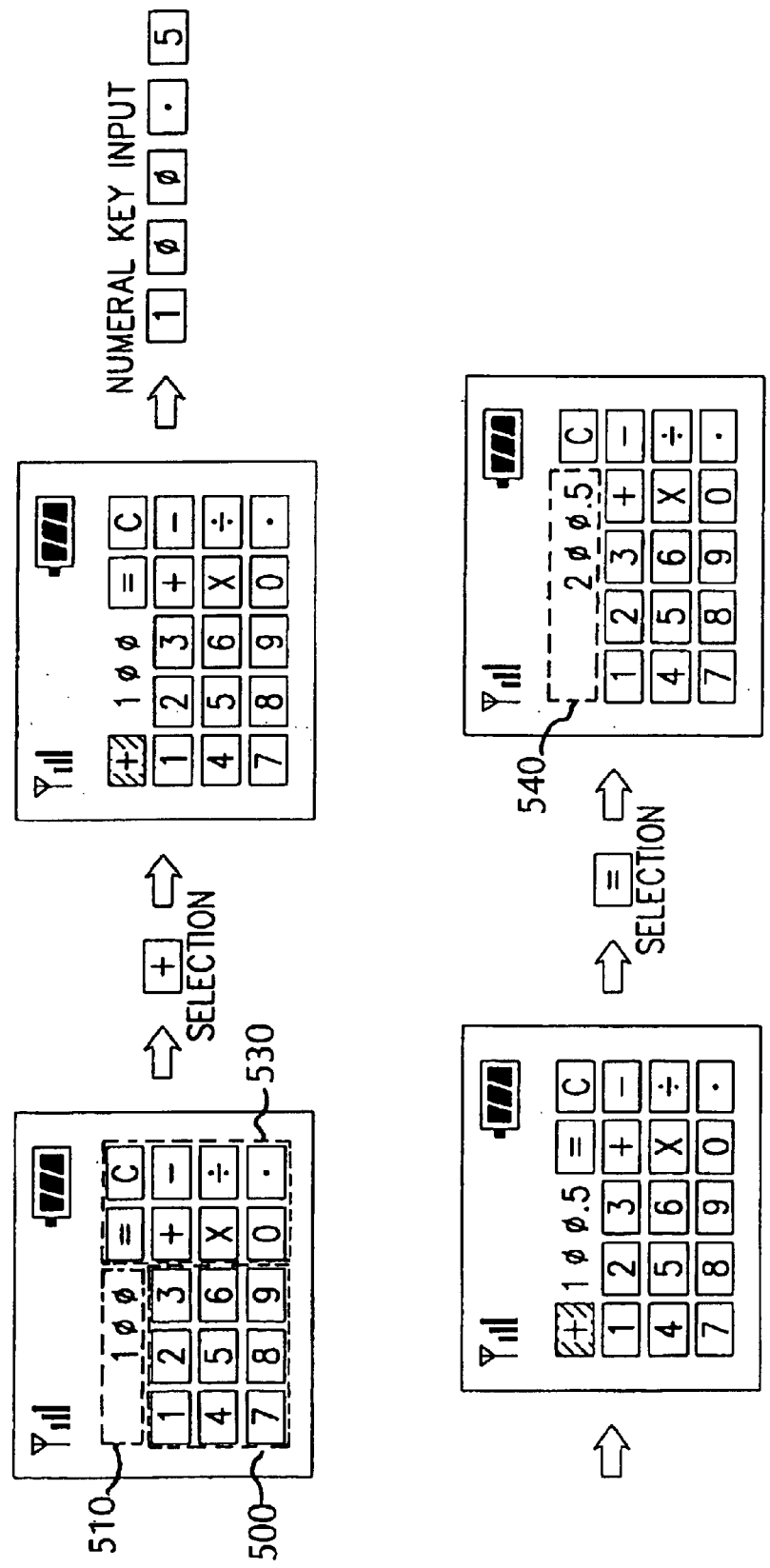
FIG. 5 illustrates an electronic calculator operating state displayed on a display screen of a conventional portable terminal where the electronic calculator function is implemented according to an embodiment of the present invention.

FIG. 5 is a view illustrating the electronic calculator operating state displayed on a display screen of a conventional portable terminal where the electronic calculator function is implemented according to an embodiment of the present invention in contrast to the state of FIG. 1. FIG. 5 shows a user's performance of the required calculation operation after the electronic calculator mode is set according to the embodiment of the present invention. First, if the user inputs the numerals '100' through the numeral input window 500, the inputted numerals '100' are displayed on the output window 510. Thereafter, if the user inputs the '+' operator on the operation/control command display window 530, the inputted '+' operator is displayed on the specified region of the output window 510 in an inverted state. Thereafter, if the user inputs the numerals '100.5' and then the '=' operator, the numerals '200.5' are displayed on the enlarged output window 540 as a result of the '+' operation of the previously inputted '100' and '100.5'. At this time, the region of the operation/command display window 530 where the '=' operator was displayed is deleted, and the deleted region now used by to the enlarged output window 540 to display the resultant output of '200.5'.

As a result, according to the embodiment of the present invention, the size of the output window where the operation result is displayed is variably changed, and thus the display of all the operation information can be effected on the relatively small-sized display screen. Also, it is possible to implement the electronic calculator function in the portable terminal which can be more conveniently used by the user. Also, since the display of the numeral information having the large number of figures can be possible, the user can more easily recognize the operation result.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A method of implementing an electronic calculator function in a portable terminal having a display, comprising the steps of:

setting an electronic calculator mode;

displaying separately on the display:

a first input window which receives and displays therein numeric information subject to arithmetic operation, a second input window which receives and displays therein operation/control commands, and an output window which displays therein an information input state and a result of the operation;

displaying the numeric information in the output window when the corresponding information is inputted through the first input window;

performing an operation on the numeric information displayed in the output window when the operation/control commands are inputted through the second input window;

reducing a size of the first and second input windows to allow the output window to increase in size when needed to display additional resultant numeric information; and displaying resultant numeric information, resulting from the operation, in the output window.

2. The method as claimed in claim 1, wherein the first input window is positioned on one side in a lower portion of the display, the second input window is positioned on an opposing side to the first input window in a lower portion of the display, and the output window is positioned above the first input window and the second input window.

3. The method as claimed in claim 1, wherein the first input window includes icons which have a predetermined shape corresponding to numerals to be operated.

4. The method as claimed in claim 1, wherein the second input window includes icons which correspond to respective operation and control commands.

5. The method as claimed in claim 1, wherein portions of the first and second input windows, which are eliminated to provide space to enlarge the output window size, contained icons displayed therein.

6. A method of implementing an electronic calculator function in a portable terminal with a display, comprising:

displaying a first input window which has divided regions corresponding to numeric information and receiving input numeric information;

displaying a second input window which has divided regions corresponding to operation/control commands and receiving input operation/control commands;

displaying an output window for displaying the input numeric information and for subsequently displaying resultant numeric information, resulting from performing an arithmetic operation on the input numeric information according to the received input operation/control commands displayed in the second input window; and reducing a size of the first and second input windows to allow the output window to increase in size when needed to display additional resultant numeric information.

7. The method as claimed in claim 6, wherein the divided regions correspond to respective icons displayed therein.

8. The method as claimed in claim 6, wherein the divided regions of the first input window correspond to numeric icons for numeric input.

9. The method as claimed in claim 6, wherein the divided regions of the second input window correspond to icons for an-input of four arithmetic operations (+−*/), a deletion command, a decimal point, and a perform operation command.

10. The method as claimed in claim 6, wherein a selected one of the divided regions of the first and second input windows are displayed in an inverted state.

11. The method as claimed in claim 10, wherein the selected one of the divided regions alternates in response to an input of a direction key.

12. The method as claimed in claim 6, wherein the input numeric information and the operation/control commands are inputted to and displayed on the first and second input windows, respectively, according to an input of predetermined key buttons.

* * * * *